United States Patent [19]

Inoue

[11] Patent Number: 5,643,132
[45] Date of Patent: Jul. 1, 1997

[54] TOROIDAL CONTINUOUS VARIABLE TRANSMISSION

[75] Inventor: Eiji Inoue, Sagamihara, Japan

[73] Assignee: Isuzu Motors Limited, Tokyo, Japan

[21] Appl. No.: 614,010

[22] Filed: Mar. 12, 1996

[30] Foreign Application Priority Data

Mar. 14, 1995 [JP] Japan .................................. 7-080858
Mar. 14, 1995 [JP] Japan .................................. 7-080859

[51] Int. Cl.$^6$ .................................................. F16H 15/38
[52] U.S. Cl. ........................................... 476/10; 477/50
[58] Field of Search ................................ 476/10; 477/50

[56] References Cited

U.S. PATENT DOCUMENTS 4,744,032  5/1988  Inoue ................................. 476/10 X

FOREIGN PATENT DOCUMENTS 61-184262  8/1986  Japan .

*Primary Examiner*—Allan D. Herrmann
*Attorney, Agent, or Firm*—Browdy and Neimark

[57] ABSTRACT

The present invention provides a toroidal continuous variable transmission, which corrects an output signal to the solenoid valve according to changes in the temperature of the working oil and thereby secures a desired transmission ratio without being affected by working oil temperature changes or by variations in performance of the constitutional components. The controller has stored in memory a relation, predetermined from experiments, between the working oil temperature and the characteristic of output pressure supplied from the solenoid valve. Once the target transmission ratio is determined by the main routine, the controller calculates the amount of correction for the output signal to the solenoid valve based on the signal from the oil temperature sensor, corrects the conventional output signal by the correction amount, and outputs the corrected output signal to the solenoid valve. Therefore, the pressure applied to the left end of the sleeve is free from influences of changes in the working oil temperature, making it possible to produce a desired transmission ratio.

2 Claims, 6 Drawing Sheets

TOROIDAL CONTINUOUS VARIABLE TRANSMISSION

BACKGROUND OF THE INVENTION

1. Field of the Invention

The present invention relates to a toroidal continuous variable transmission with a speed change unit that continuously changes the rotation speed of an input disk according to a tilt angle of power rollers with respect to the input disk and output disk arranged opposite each other and transmits the changed revolution speed to the output disk.

2. Description of the Prior Art

The toroidal continuous variable transmission generally has a toroidal speed change unit 1 shown in FIG. 5. The toroidal speed change unit 1 of the toroidal continuous variable transmission comprises an input disk 2 and an output disk 3 arranged opposite each other; a pair of power rollers 4 (only one power roller is shown) that continuously change the revolution speed of the input disk 2 as their tilt angles with respect to the input and output disks 2, 3 change, and transmit the regulated revolution to the output disk 3; and a pair of trunnions 6 (only one of them is shown) each rotatably supporting the power rollers 4 and tiltable about a tilt shaft 5.

The trunnion 6 is normally at the neutral position for a certain transmission ratio. That is, the trunnion 6 is disposed at a position where the rotation axis A—A of the input disk 2 and output disk 3 crosses the rotation axis B—B of the power roller 4 (=neutral position). Speed change is effected by displacing the trunnion 6 in the axial direction of the tilt shaft 5 from the neutral position. As the trunnion 6 is displaced in the axial direction of the tilt shaft 5, it is pivoted about the tilt shaft 5 in a direction and at a speed that correspond to the direction and amount of the displacement to change the ratio between a radius described by the contact point of the input disk 2 and the power roller 4 and a radius described by the contact point of the output disk 3 and the power roller 4. The changed radius ratio causes the revolution speed of the output disk 3 to change relative to that of the input disk 2.

In the above toroidal continuous variable transmission, the power roller 4 is tilted by a control apparatus. A variety of control apparatuses have been known. An example control apparatus (Japan Patent Laid-Open No. 184262/1986), as shown in FIG. 5, comprises: a sleeve 11 slidably installed in a hole in a valve case 12; a spool 13 slidably fitted in the sleeve 11; a precess cam 18 moved together with the trunnion 6 to displace the spool 13 in the axial direction; a hydraulic cylinder 8 which, as the spool 13 and the sleeve 11 axially slide to change their positional relationship, is supplied with or drained of oil pressure to displace the trunnion 6 in the axial direction of the tilt shaft; a drive means 19 to displace the sleeve 11 in the axial direction; and a controller 20 to send a control signal representing a target transmission ratio to the drive means 19. There are various types of drive means 19. The drive means 19 shown in FIG. 5 uses a solenoid valve 19 to control the oil pressure acting on the end of the sleeve 11.

The solenoid valve 19 controls the magnitude of pressure Ps acting on the left end of the sleeve 11 according to the output signal from the controller 20. The sleeve 11 is shifted toward the right in FIG. 5 by the action of the pressure Ps. Because the sleeve 11 is urged toward the left by a return spring 15, the application of oil pressure through the solenoid valve 19 to the left end of the sleeve 11 causes the sleeve 11 to move to a position where the pressure Ps and the force of the return spring 15 balance each other.

In the above control apparatus, the controller 20 sends an output signal representing a target transmission ratio to the solenoid valve 19. As shown in the flow chart of FIG. 6, when the control apparatus starts, the main routine calculates the target transmission ratio $e_0$ based on the speed change information (step 21). The controller 20 then calculates a duty according to the target transmission ratio $e_0$ (step 22). The calculated duty is output to the solenoid valve 19 (step 23). The processing returns to the start of the main routine.

Next, the speed change operation performed by the toroidal continuous variable transmission is explained in the following. Let us first consider a case of shifting toward a speed-decrease side by referring to FIG. 5.

(1) A signal from the controller 20 activates the solenoid valve 19 to apply the pressure Ps to the left end of the sleeve 11, which is then moved toward the right from the position shown in FIG. 5. When the positional relation between the sleeve 11 and the spool 13 change, the Pd circuit and the PL circuit communicate with each other supplying the line pressure PL to a cylinder chamber 8b on the speed-decrease side from the oil pressure source. At the same time, the Pu circuit and the drain circuit communicate, draining the oil pressure from a cylinder chamber 8a on the speed-increase side to a tank. As a result, the relationship of circuit pressures becomes Pd>Pu, which offsets the trunnion 6 downward causing the power roller 4 to start tilting about the tilt shaft 5 in the direction of arrow DOWN by the side slip force.

(2) As the power roller 4 tilts, the spool 13 is shifted toward the right in FIG. 5 by a distance that corresponds to a power roller's synthesized displacement—a combination of the power roller's displacement in the axial direction of the tilt shaft and its tilt angle—thus throttling the communication passage between the Pd circuit and the PL circuit and the communication passage between the Pu circuit and the drain circuit. When the positional relationship between the sleeve 11 and the spool 13 becomes neutral, the circuit pressures becomes Pd=Pu.

(3) In this state, however, the power roller 4 is still offset in the axial direction of the tilt shaft and thus continue tilting by the side slip force. This in turn causes the spool 13 to move to the right from the neutral position relative to the sleeve 11, opening the communication passage between the Pd circuit and the drain and the communication passage between the Pu circuit and the PL circuit. As a result, the pressure relation in the circuits becomes Pd<Pu, moving the trunnion 6 upward, reducing the displacement of the power roller 4 in the axial direction of the tilt shaft, which in turn weakens the side slip force, reducing the pivoting or tilting speed.

(4) As the trunnion 6 repeats the vertical reciprocating motion with the neutral position at the center, the oscillation amplitude decreases progressively until the axial displacement of the power roller 4 is zero and the position of the spool 13 is neutral with respect to the sleeve 11, at which time the speed change operation is completed.

When the temperature of the working oil acting on the left end of the sleeve 11 changes, the viscosity of the oil varies greatly. In the conventional toroidal continuous variable transmission described above, the change in the viscosity of the working oil changes the output pressure characteristic of the solenoid valve 19, so that the sleeve 11 is controlled to a position different from that to which the controller 20 intends to move the sleeve 11. As a result, a desired transmission ratio cannot be obtained.

Furthermore, the components such as solenoid valve and return spring have variations in characteristic due to manufacture variations and changes with time, resulting in the transmission ratio being distributed with respect to the output signal from the controller to the solenoid valve and thus being unable to be controlled to an intended value.

SUMMARY OF THE INVENTION

An object of this invention is to solve the above-mentioned problems and to provide a toroidal continuous variable transmission, which corrects the output signal to the solenoid valve according to oil temperature changes or variations in performance of the constitutional components and thereby produces a desired transmission ratio without being affected by the working oil temperature changes or performance variations of constitutional components.

The present invention relates to a toroidal continuous variable transmission which comprises: an input disk and an output disk disposed opposite each other; a pair of power rollers that continuously change the rotation of the input disk according to changes in a tilt angle of the power rollers with respect to the input and output disks and transmit it to the output disk; trunnions that each rotatably support the power roller and which can be displaced in the axial direction of a tilt shaft; a hydraulic cylinder to displace the trunnions in the axial direction of the tilt shaft; a control valve which comprises a sleeve slidably installed in a valve case and a spool slidably inserted in the sleeve and controls oil pressure supplied to the hydraulic cylinder by the relative displacement of the sleeve and the spool; a precess cam moved together with the trunnions to displace the spool axially; a solenoid valve to supply working oil for displacing the sleeve axially; an oil temperature sensor to detect the temperature of the working oil; and a controller which determines an amount of correction for an output signal to the solenoid valve according to the working oil temperature, corrects the output signal to the solenoid valve by the correction amount according to a target transmission ratio, and outputs the corrected output signal to the solenoid valve.

In this toroidal continuous variable transmission, the controller has stored in memory a relation, predetermined from experiments, between the oil temperature and the characteristic of output pressure supplied from the solenoid valve. Or the solenoid valve has stored in memory a relation, predetermined from experiments, between the oil temperature and the amount of correction for output signal to solenoid valve. Once the target transmission ratio is decided in the main routine, the controller calculates the amount of correction for the output signal to the solenoid valve according to the signal from the oil temperature sensor, corrects the conventional output signal by the correction amount, and outputs the corrected signal to the solenoid valve. In this way, because the output signal to the solenoid valve is corrected according to oil temperature changes, the pressure Ps applied to the left end of the sleeve is not affected by the temperature change of the working oil, making it possible to produce a target transmission ratio.

Because the toroidal continuous variable transmission has the controller which detects the temperature of the working oil, determines the amount of correction for the output signal to the solenoid valve according to the oil temperature, corrects the output signal to the solenoid valve by the correction amount according to the target transmission ratio, and outputs the corrected output signal to the solenoid valve, the position of the sleeve can be appropriately corrected even when the viscosity of the working oil acting on one end of the sleeve is changed by oil temperature changes, thereby securing a target transmission ratio.

Further, this toroidal continuous variable transmission does not require expensive sensors, such as a sleeve position sensor and a sensor to detect the output pressure of the solenoid valve, but need only use the oil temperature sensor to secure a predetermined transmission ratio without being affected by the oil temperature variations. The transmission can therefore be manufactured with reduced cost.

The present invention further relates to the toroidal continuous variable transmission which comprises: an input disk mounted on an input shaft;

an output disk mounted on an output shaft and disposed opposite the input disk; a pair of power rollers that continuously change the rotation of the input disk according to changes in a tilt angle of the power rollers with respect to the input and the output disks and transmit it to the output disk; trunnions that rotatably support the power rollers and can be displaced in the axial direction of the tilt shaft; a hydraulic cylinder to displace the trunnions in the axial direction of the tilt shaft; a control valve which comprises a sleeve slidably installed in a valve case and a spool slidably inserted in the sleeve and controls oil pressure supplied to the hydraulic cylinder by the relative displacement of the sleeve and the spool; a precess cam moved together with the trunnions to displace the spool axially; a solenoid valve to supply working oil for displacing the sleeve axially; and a controller which calculates an actual transmission ratio from the revolutions of the input shaft and the revolutions of the output shaft, calculates a transmission ratio difference between the target transmission ratio and the actual transmission ratio, determines an amount of correction for an output signal to the solenoid valve corresponding to the transmission ratio difference, corrects the output signal to the solenoid valve by the correction amount according to the target transmission ratio, and outputs the corrected output signal to the solenoid valve.

When a torque converter is used in a power transmission system, the feedback of the transmission ratio is executed only when the lockup clutch is working. The transmission ratio difference may be detected by measuring the revolutions of the input shaft and the output shaft in the toroidal speed change unit or the revolutions of parts connected to the input and output shafts through gears. The means of detecting the transmission ratio difference may, for example, use a sensor for detecting the revolution of the output shaft of the transmission and an engine revolution sensor.

In the toroidal continuous variable transmission of the above configuration, the revolutions of the input shaft and the output shaft in the toroidal speed change unit are detected, and the controller calculates the actual transmission ratio from these revolutions to determine the transmission ratio difference between the target transmission ratio and the actual transmission ratio. The controller has stored in memory a correspondence table, predetermined from experiments, between the transmission ratio difference and the amount of correction for the output signal to the solenoid valve. Based on the correspondence table, the controller determines the amount of correction for the output signal to the solenoid valve. This toroidal continuous variable transmission corrects the conventional output signal by the correction amount and outputs the corrected output signal to the solenoid valve. In this way, the transmission ratio difference is fed back to correct the output signal to the solenoid valve, so that the controlled position of the sleeve is free from the influences of the working oil temperature changes or performance variations of constitutional components, thus making it possible to secure a desired transmission ratio.

Because this toroidal continuous variable transmission has the controller, which calculates the actual transmission ratio from the revolutions of the input shaft and the output shaft, determines the transmission ratio difference between the target transmission ratio and the actual transmission ratio, determines the amount of correction for the output shaft to the solenoid valve corresponding to the transmission ratio difference, corrects the output signal to the solenoid valve by the correction amount according to the target transmission ratio, and outputs the corrected output signal to the solenoid valve, the sleeve position can be corrected properly to maintain the transmission ratio at a desired value even when the viscosity of the working oil acting on one end of the sleeve is changed by the oil temperature changes or when there are variations in the performance of the constitutional components such as solenoid valve and return spring.

Further, this toroidal continuous variable transmission does not require expensive sensors, such as a sleeve position sensor and a sensor to detect the output pressure of the solenoid valve, but need only use the revolutions sensors to detect revolutions of input and output shafts to secure a desired transmission ratio without being affected by the oil temperature variations or performance variations of constitutional components. The cost of the transmission can therefore be reduced.

DETAILED DESCRIPTION OF THE PREFERRED EMBODIMENTS

Figure 1:
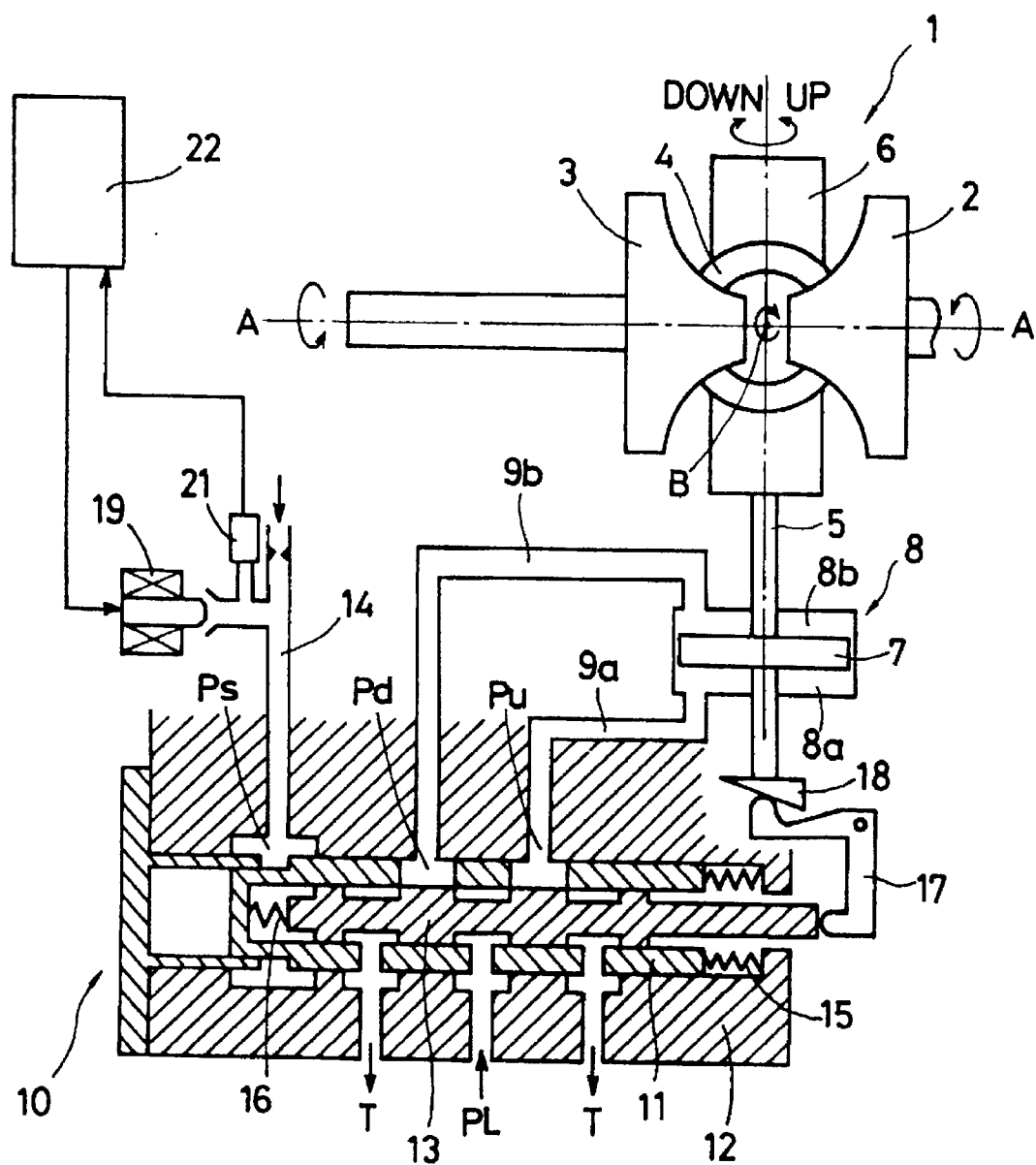
FIG. 1 is a schematic diagram showing one embodiment of the toroidal continuous variable transmission according to this invention.
Figure 5:
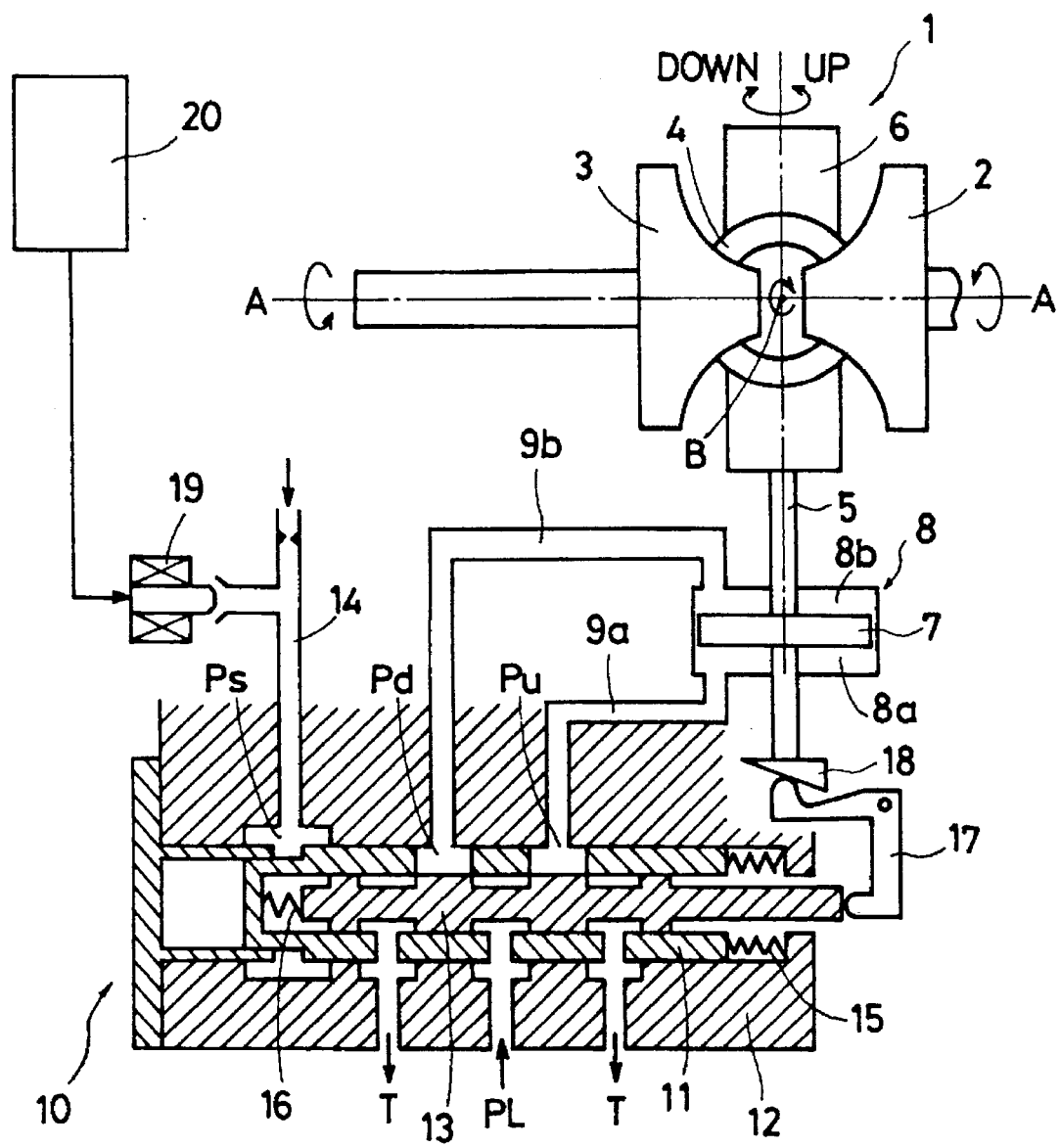
FIG. 5 is a schematic diagram showing one example of a conventional toroidal continuous variable transmission.
Figure 6:
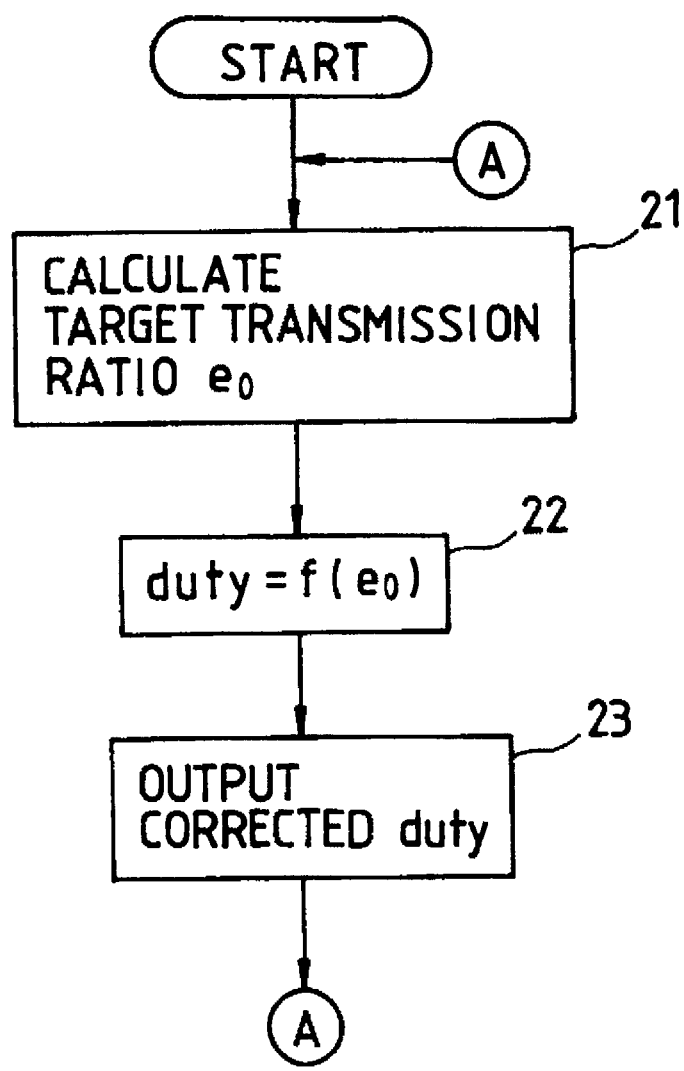
FIG. 6 is a flow chart showing the operation of the toroidal continuous variable transmission of FIG. 5.

Embodiments of the toroidal continuous variable transmission according to this invention will be described by referring to the accompanying drawings. In FIG. 1, components having the same constructions and functions as those of the conventional toroidal continuous variable transmission of FIG. 5 are assigned like reference numerals.

A toroidal speed change unit 1 of the toroidal continuous variable transmission, as shown in FIG. 1, includes an input disk 2 and an output disk 3 arranged opposite each other; a pair of power rollers 4 (only one power roller is shown) that continuously change the revolution of the input disk 2 according to a change in their tilt angle with respect to the input and output disks 2, 3 and transmit it to the output disk 3; and a pair of trunnions 6 (only one trunnion is shown) that each rotatably support the power rollers 4 and can be displaced in the axial direction of a tilt shaft 5.

The trunnion 6 are supported on the transmission casing (not shown) so that they are pivotable and axially movable.

That is, the trunnions 6 each have a tilt shaft 5, in the axial direction of which the trunnions 6 are movable and about which the power roller 4 is pivotable. The tilt shaft 5 of the trunnion 6 is rigidly connected with a piston 7, which is slidably installed in a hydraulic cylinder 8 formed in the transmission casing. The hydraulic cylinder 8 has two cylinder chambers separated by the piston 7, a speed-increase side cylinder chamber 8a and a speed-decrease side cylinder chamber 8b. When the speed-increase side cylinder chamber 8a is supplied with an oil pressure, the toroidal speed change unit 1 shifts toward the speed-increase side. When the speed-decrease side cylinder chamber 8b is supplied with the oil pressure, the toroidal speed change unit 1 shifts toward the speed-decrease side.

The cylinder chambers 8a, 8b of the hydraulic cylinder 8 are connected to a control valve 10 through oil passages 9a, 9ab. The control valve 10 has a Pu port communicating to the speed-increase side cylinder chamber 8a through the oil passage 9a and a Pd port communicating to the speed-decrease side cylinder chamber 8b through the oil passage 9b. The control valve 10 also has a PL port communicating to the oil pressure source to supply a line pressure PL and two T ports communicating to a tank to drain oil pressure. The control valve 10 also has a Ps port to supply the oil pressure to one end of the sleeve 11.

The control valve 10 comprises a sleeve 11 slidably installed in a hollow formed in the valve case 12 and a spool 13 slidably fitted in the sleeve 11. When the sleeve 11 and the spool 13 assume the positional relationship as shown in FIG. 1, they are at the neutral position. When the sleeve 11 and the spool 13 are at the neutral position, the communication passage between the Pd circuit (=oil passage 9b) and the PL circuit, the communication passage between the Pd circuit and the drain circuit, the communication passage between the Pu circuit (=oil passage 9a) and the PL circuit and the communication passage between the Pu circuit and the drain are all closed.

The valve case 12 is connected with a passage 14, through which oil pressure is applied to one end of the sleeve 11. Between the other end of the sleeve 11 and the hole wall of the valve case 12 is installed a return spring 15 that urges the sleeve 11 toward the left in FIG. 1. The oil pressure applied through the passage 14 to one end of the sleeve 11 causes the sleeve 11 to move to the right against the force of the return spring 15.

The spool 13 is slidably installed in the sleeve 11 and a spring 16 is interposed between one end of the sleeve 11 and one end of the spool 13. The spring 16 urges the spool 13 toward the right in FIG. 1. The other end of the spool 13 is engaged with one end of a lever 17 pivotably supported at its center. The other end of the lever 17 contacts a precess cam 18 mounted at the end of the tilt shaft 5. The spool 13 is axially displaced as the trunnion 6 is moved in the axial direction of the tilt shaft 5 or pivoted about the tilt shaft 5.

A solenoid valve 19 is installed in the passage 14 leading to the control valve 10 and controls the oil pressure supplied to one end of the sleeve 11. That is, based on the output signal from the controller 22, the solenoid valve 19 regulates the magnitude of the pressure Ps acting on the left end of the sleeve 11. The pressure Pa causes the sleeve 11 to shift to the right or left from the neutral position of FIG. 1. Because the sleeve 11 is urged toward the left by the return spring 15, when the oil pressure is applied through the solenoid valve 19 to the left end of the sleeve 11, the sleeve 11 is moved to the position where the pressure Ps and the force of the return spring 15 balance each other.

The toroidal continuous variable transmission includes various sensors such as car speed sensor, engine revolution sensor and throttle opening sensor (not shown), and the speed change information signals such as car speed, engine revolution and throttle opening detected by these sensors are supplied to the controller 22. Based on these speed change information, the controller 22 calculates a target transmission ratio. In the passage 14 there is an oil temperature sensor 21 to measure the temperature of the working oil. The signal from the oil temperature sensor 21 is also sent to the controller 22. The controller 22 calculates a duty according to the target transmission ratio and the oil temperature and sends the duty signal to the solenoid valve 19 for controlling the valve. The duty means a ratio between ON duration and OFF duration in the pulse width modulation control. That is, the duty is represented in percentage and given as follows.

duty=(solenoid ON duration in one cycle/solenoid operation cycle)×100

The toroidal speed change unit 1 assumes the neutral position under the condition shown in FIG. 1. That is, the trunnion 6 is at a position where the rotation center line A—A of the input disk 2 and output disk 3 intersects the rotation center line B—B of the power roller 4, i.e., at the position (=) neutral position) where the both center lines are on the same plane. The speed change is performed by displacing the trunnion 6 in the axial direction of the tilt shaft from the neutral position. When the trunnion 6 is moved in the axial direction of the tilt shaft, they are pivoted about the tilt shaft in a direction and at a speed corresponding to the direction and amount of axial displacement, thus changing the ratio between a radius described by the contact point of the input disk 2 and the power roller 4 and a radius described by the contact point of the output disk 3 and the power roller 4. The changed ratio results in a change in a revolution speed. The angle formed between a plane perpendicular to the rotation center line A—A of the input and output disks 2, 3 and the rotation center line B—B of the power roller 4 is called a tilt angle.

Next, the speed change operation performed by the toroidal continuous variable transmission is explained below. Let us first consider a case where the toroidal speed change unit 1 shifts to the speed-decrease side by referring to FIG. 1.

(1) The signal from the controller 22 activates the solenoid valve 19, applying the large pressure Ps to the left end of the sleeve 11, which is moved from the neutral position toward the right. This changes the positional relation between the sleeve 11 and the spool 13, opening the communication passage between the Pd circuit and the PL circuit to supply oil pressure to the speed-decrease side cylinder chamber 8b. At the same time, the communication passage between the Pu circuit and the drain is opened to discharge the oil pressure from the speed-increase side cylinder chamber 8a to the tank. As a result, the pressure relation becomes Pd>Pu, causing the trunnion 6 to be offset downwardly. Then, the power roller 4 starts pivoting about the tilt shaft 5 in the direction of arrow DOWN by the side slip force.

(2) As the power roller 4 tilts, the spool 13 shifts toward the right in FIG. 1 by a distance corresponding to a power roller's synthesized displacement—a combination of power roller's displacement in the axial direction of the tilt shaft and its tilt angle—thus throttling the communication passage between the Pd circuit and the PL circuit and the communication passage between the Pu circuit and the drain circuit. When the positional relationship between the sleeve 11 and the spool 13 becomes neutral, the circuit pressures becomes Pd=Pu, at which time the axial displacement of the trunnion 6 stops.

(3) In this state the power roller 4 remains offset downward in the axial direction of the tilt shaft and therefore continue tilting by the side slip force. As a result, the spool 13 moves further toward the right from the neutral position with respect to the sleeve 11, opening the communication passage between the Pd circuit and the drain and the communication circuit between the Pu circuit and the PL circuit, resulting in the pressure relation of Pd<Pu. This in turn causes the trunnion 6 to move upward to reduce the displacement of the power roller 4 in the axial direction of the tilt shaft, thus reducing the side slip force and the tilting speed. At this time, the trunnion 6 slightly overshoots upward from the neutral position.

(4) As the trunnion 6 moves up, the spool 13 starts moving toward the left to close the communication passages. As the spool 13 continues moving further toward the left, the communication passage between the Pd circuit and the PL circuit and the communication passage between the Pu circuit and the drain circuit are opened, making the pressure relation Pd>Pu. As a result, the overshot trunnion 6 now starts moving down again.

(5) While the trunnion 6 repeats the vertical reciprocating motion about the neutral position, the amplitude of the reciprocating motion decreases progressively until the axial displacement of the power roller 4 is zero and the spool 13 is located at the neutral position with respect to the sleeve 11, at which time the speed change operation is completed.

Conversely, when the toroidal speed change unit 1 is shifted toward the speed-increase side, the operation performed is as follows.

(1) When the speed change is made toward the speed-increase side, the pressure Ps acting on the left end of the sleeve 11 is small, so that the sleeve 11 is moved toward the left from the position shown in FIG. 1 by the action of the return spring 15. This changes the positional relationship between the sleeve 11 and the spool 13, opening the communication passage between the Pu circuit and the PL circuit to supply oil pressure to the speed-increase side cylinder chamber 8a and at the same time opening the communication passage between the Pd circuit and the drain circuit to discharge the oil pressure from the speed-decrease side cylinder chamber 8b to the tank. The resulting pressure relation becomes Pd<Pu, causing the trunnion 6 to be offset upward. The power roller 4 therefore starts pivoting about the tilt shaft 5 in the direction of arrow UP.

(2) As the power roller 4 tilts, the spool 13 is shifted toward the left in FIG. 1 by a distance that corresponds to a synthesized displacement—the combination of power roller's displacement in the axial direction of the tilt shaft and its tilt angle—throttling the communication passage between the Pu circuit and the PL circuit and the communication passage between the Pd circuit and the drain circuit until the positional relationship between the sleeve 11 and the spool 13 becomes neutral, at which time the pressure relation is Pd=Pu stopping the axial displacement of the trunnion 6.

(3) In this state, however, the power roller 4 is still offset axially upward and thus continue tilting by the side slip force. This causes the spool 13 to move further toward the left from the neutral position with respect to the sleeve 11, opening the communication passage between the Pu circuit and the drain and the communication passage between the Pd circuit and the PL circuit. As a result, the pressure relation in the circuits becomes Pd>Pu, moving the trunnion 6 downward, reducing the axial displacement of the power roller 4, which in turn weakens the side slip force, reducing the tilting speed. At this time, the trunnion 6 slightly overshoots downward from the neutral position.

(4) As the trunnion 6 moves down, the spool 13 urged by the spring 16 moves to the right closing the communication passages. As the spool 13 continues moving further toward the right, the communication passage between the Pu circuit and the PL circuit and the communication passage between the Pd circuit and the drain circuit are opened, making the pressure relation Pd<Pu. As a result, the trunnion 6 that was displaced downward from the neutral position now starts moving up.

(5) While the trunnion 6 repeats the vertical reciprocating motion about the neutral position, as described above, the amplitude of the reciprocating motion decreases progressively until the axial displacement of the power roller 4 is zero and the spool 13 is located at the neutral position with respect to the sleeve 11, at which time the speed change operation is completed.

Figure 2:
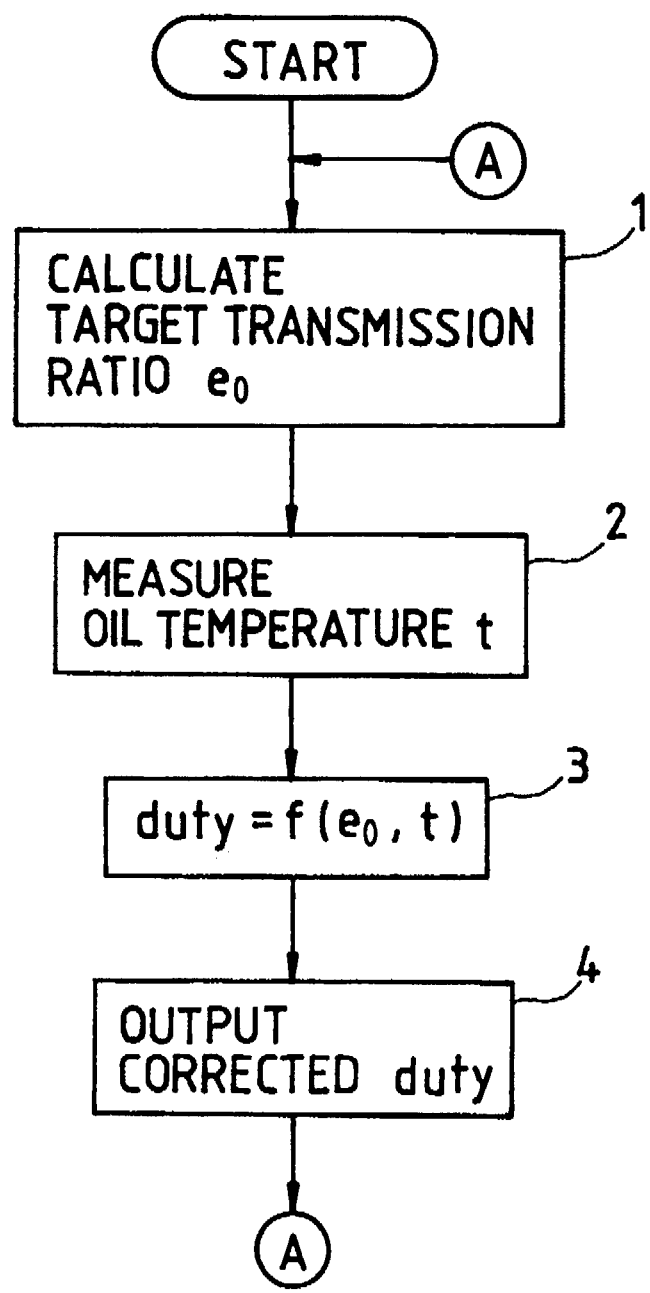
FIG. 2 is a flow chart showing the operation of the toroidal continuous variable transmission of FIG. 1.

Next, the operation of the toroidal continuous variable transmission is described by referring to the flow chart of FIG. 2. In this toroidal continuous variable transmission, the controller 22 sends an output signal corresponding to the target transmission ratio and the oil temperature to the solenoid valve 19. As shown in the flow chart of FIG. 2, the control processing, after it is started, calculates in the main routine the target transmission ratio $e_0$ from the speed change information detected by various sensors (step 1). After the target transmission ratio $e_0$ is calculated, the temperature of the working oil supplied to the control valve 10 is measured by the oil temperature sensor 21 (step 2). The temperature signal is fed to the controller 22, which accesses a correspondence table that stores the relation between the oil temperature and the amount of correction. The controller 22 then determines the amount of duty correction corresponding to the detected oil temperature and thereby corrects the duty by the correction amount according to the target transmission ratio $e_0$ (step 3). The corrected duty is output to the solenoid valve 19 (step 4). The control processing returns to the start of the main routine.

Even when, during the speed change control, the temperature of the working oil acting on the left end of the sleeve 11 changes and the viscosity of the working oil also changes, the desired transmission ratio can be obtained without being adversely affected by the oil temperature variations by detecting the oil temperature and correcting the duty output to the solenoid valve 19.

While the control apparatus explained in the above embodiment controls only one toroidal speed change unit 1 for simplicity, it can also be applied to a double cavity type toroidal continuous variable transmission in which two toroidal speed change units 1 are arranged on the same axis, with the output disks 3 of the units coupled. In that case, the passages 9a, 9b need be branched and connected to the hydraulic cylinders of another speed change unit.

Figure 3:
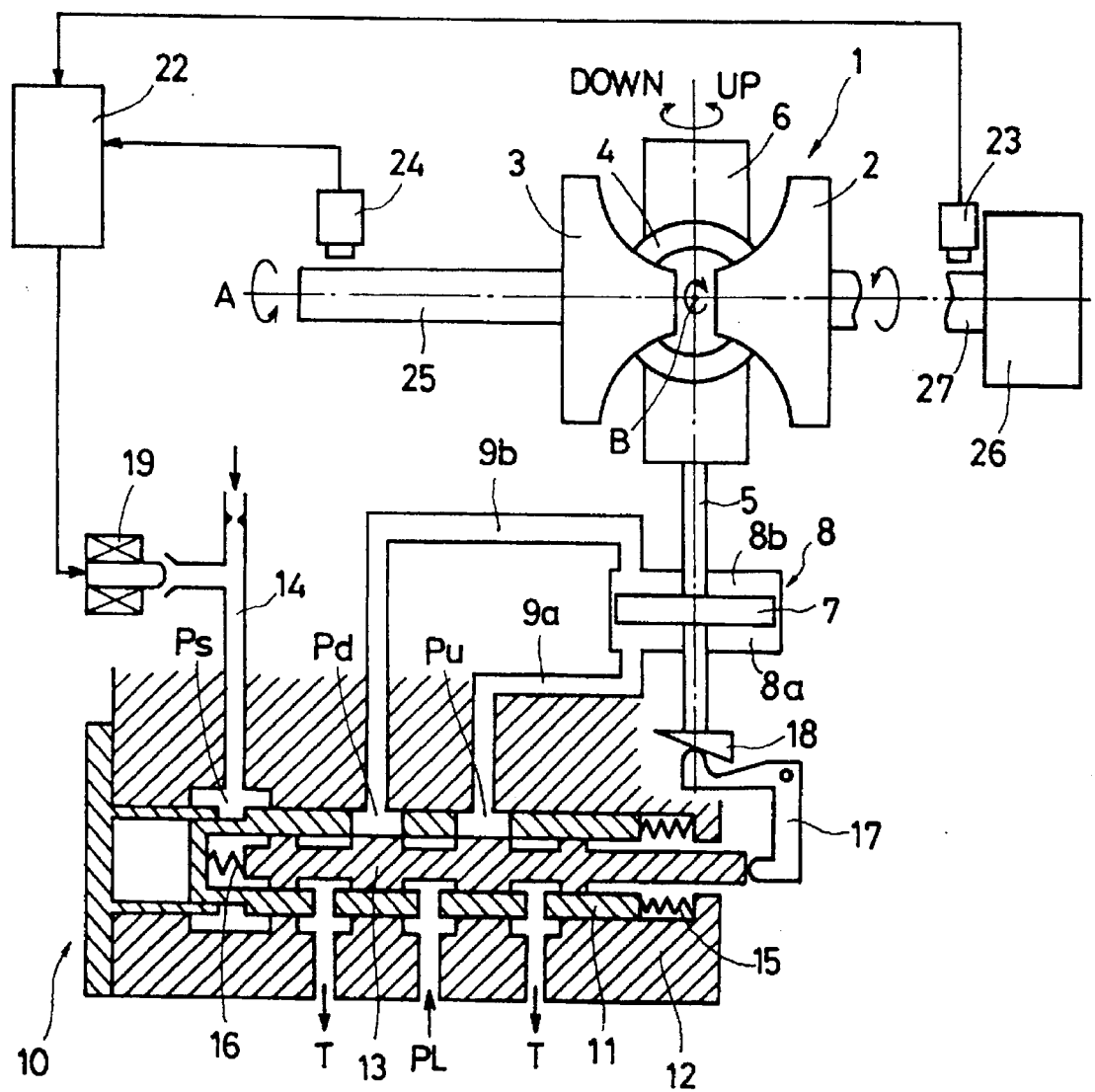
FIG. 3 is a schematic diagram showing the toroidal continuous variable transmission of this invention.
Figure 4:
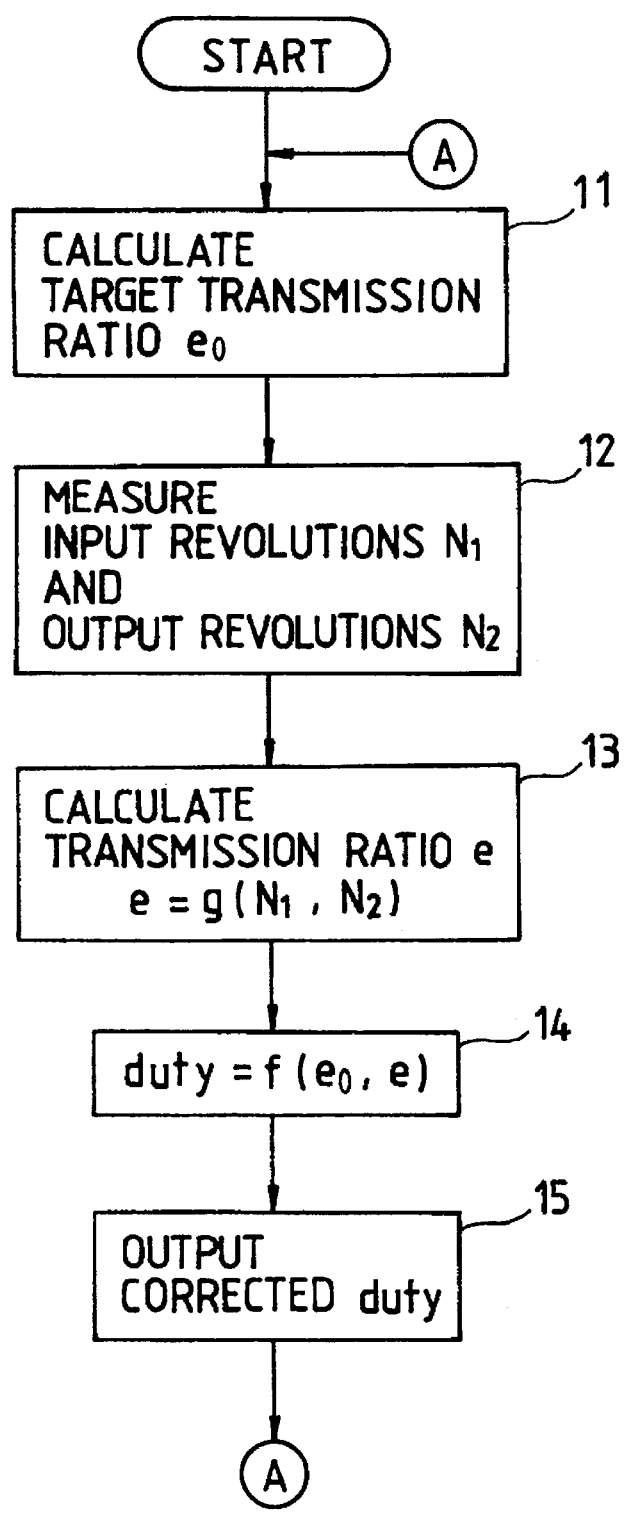
FIG. 4 is a flow chart showing the operation of the toroidal continuous variable transmission of FIG. 3.

Next, by referring to FIG. 3 and 4, another embodiment of the toroidal continuous variable transmission according to this invention is explained. In FIG. 3, components identical with those of the toroidal continuous variable transmission of FIG. 1 are assigned like reference numerals and their explanations are not repeated here.

This toroidal continuous variable transmission has an output shaft revolution sensor 24, which detects the revolutions of the output shaft 25 connected to the output disk 3 of the toroidal speed change unit 1. An engine revolution sensor 23 detects the revolutions of the engine 26, i.e., the revolutions of the input shaft 27 connected to the input disk 2 of the toroidal speed change unit 1. These detected revolutions are sent to the controller 22.

The controller 22 calculates an actual transmission ratio e from the revolution speeds of the input shaft 27 and the output shaft 25 and also calculates a duty according to the difference between the actual transmission ratio e and the target transmission ratio $e_0$. The duty signal is sent to the solenoid valve 19 for controlling the valve. The duty means a ratio between ON duration and OFF duration in the pulse width modulation control. That is, the duty is represented as follows.

duty=(solenoid ON duration in one cycle/solenoid operation cycle)×100

In this embodiment, the operations performed when the toroidal speed change unit 1 is shifted to the speed-decrease side and to the speed-increase side are almost the same as those of the preceding embodiment, and their explanations are thus omitted here.

The control process of the toroidal continuous variable transmission is explained by referring to the flow chart of FIG. 4. In this toroidal continuous variable transmission, the controller 22 sends to the solenoid valve 19 an output signal corresponding to the target transmission ratio and an output signal corresponding to the transmission ratio difference. As shown in FIG. 4, the control processing is started to first calculate in the main routine the target transmission ratio $e_0$ based on the speed change information detected by various sensors (step 11). Next, an input revolutions $N_1$ of the input shaft 27 is detected by the engage revolution sensor 23 and an output revolutions $N_2$ of the output shaft 25 is detected by the output shaft revolution sensor 24. These revolutions are fed to the controller 22 (step 12). The controller 22 calculates the actual transmission ratio e from the detected revolutions $N_1$, $N_2$ (step 13). A relation, predetermined from experiments, between the amount of correction for the output signal to the solenoid valve 19 and the transmission ratio difference (deviation of the actual transmission ratio from the target transmission ratio $e_0$) is stored in memory of the controller 22 as a correspondence table. The controller 22 calculates an output signal to the solenoid valve 19 corresponding to the target transmission ratio $e_0$ as in the conventional transmission, calculates the transmission ratio difference between the actual transmission ratio e and the target transmission ratio $e_0$, and, based on the correspondence table stored in memory, determines the amount of correction for the solenoid valve corresponding to the transmission ratio difference. This amount of correction is added to the conventional output signal in order to produce the output signal to the solenoid valve 19, i.e., the duty (step 14). The controller 22 outputs the calculated duty to the solenoid valve (step 15). The control processing returns to the start of the main routine.

Even when during the speed change control the temperature of the working oil acting on one end of the sleeve 11 changes and the viscosity of the working oil changes or if performance variations occur with the constitutional parts such as the solenoid valve and return spring due to manufacturing variations and changes with time, the desired transmission ratio can be obtained without being affected by the temperature change of working oil and performance variations of the constitutional parts because the output signal to the solenoid valve 19 is corrected according to the transmission ratio difference as mentioned above.

While the control apparatus explained in this embodiment controls only one toroidal speed change unit 1 for simplicity, it can also be applied to a double cavity type toroidal continuous variable transmission in which two toroidal speed change units 1 are arranged on the same axis, with the output disks 3 of the units coupled. In that case, the passages 9a, 9b need be branched and connected to the hydraulic cylinders of another speed change unit.

What is claimed is:

1. A toroidal continuous variable transmission comprising:

an input disk mounted on an input shaft;

an output disk disposed opposite the input disk;

power rollers that continuously change the rotation of the input disk according to changes in a tilt angle of the power rollers with respect to the input disk and the output disk and transmit it to the output disk;

trunnions that rotatably support the power rollers and tilt the power rollers about a tilt shaft as the trunnions are displaced in the axial direction of the tilt shaft from the neutral position;

a hydraulic cylinder having two cylinder chambers to displace the trunnions in the axial direction of the tilt shaft;

a control valve to regulate oil pressure supplied to the hydraulic cylinder, the control valve comprising a sleeve slidably installed in a valve case and a spool slidably inserted in the sleeve, the control valve being adapted to control the oil pressure supplied to the hydraulic cylinder by the relative displacement between the sleeve and the spool;

a precess cam moved together with the trunnions to displace the spool axially;

a solenoid valve to supply working oil for displacing the sleeve axially;

an oil temperature sensor to detect the temperature of the working oil; and a controller which determines an amount of correction for an output signal to the solenoid valve according to the working oil temperature, corrects the output signal to the solenoid valve by the correction amount according to a target transmission ratio, and outputs the corrected output signal to the solenoid valve.

2. A toroidal continuous variable transmission comprising:

an input disk mounted on an input shaft;

an output disk disposed opposite the input disk;

power rollers that continuously change the rotation of the input disk according to changes in a tilt angle of the power rollers with respect to the input disk and the output disk and transmit it to the output disk;

trunnions that rotatably support the power rollers and tilt the power rollers about a tilt shaft as the trunnions are displaced in the axial direction of the tilt shaft from the neutral position;

a hydraulic cylinder having two cylinder chambers to displace the trunnions in the axial direction of the tilt shaft;

a control valve to regulate oil pressure supplied to the hydraulic cylinder, the control valve comprising a sleeve slidably installed in a valve case and a spool slidably inserted in the sleeve, the control valve being adapted to control the oil pressure supplied to the hydraulic cylinder by the relative displacement between the sleeve and the spool;

a precess cam moved together with the trunnions to displace the spool axially;

a solenoid valve to supply working oil for displacing the sleeve axially; and a controller which calculates an actual transmission ratio from the revolutions of the input shaft and the revolutions of the output shaft, calculates a transmission ratio difference between the target transmission ratio and the actual transmission ratio, determines an amount of correction for an output signal to the solenoid valve corresponding to the transmission ratio difference, corrects the output signal to the solenoid valve by the correction amount according to the target transmission ratio, and outputs the corrected output signal to the solenoid valve.

* * * * *